US011211140B1

(12) United States Patent
Satpathy

(10) Patent No.: US 11,211,140 B1
(45) Date of Patent: Dec. 28, 2021

(54) DEVICE AUTHENTICATION BASED ON INCONSISTENT RESPONSES

(71) Applicant: Facebook Technologies, LLC, Menlo Park, CA (US)

(72) Inventor: Sudhir Satpathy, Redmond, WA (US)

(73) Assignee: FACEBOOK TECHNOLOGIES, LLC, Menlo Park, CA (US)

(*) Notice: Subject to any disclaimer, the term of this patent is extended or adjusted under 35 U.S.C. 154(b) by 254 days.

(21) Appl. No.: 16/580,774

(22) Filed: Sep. 24, 2019

(51) Int. Cl.
*G11C 29/52* (2006.01)
*G11C 29/50* (2006.01)
*G06F 21/31* (2013.01)

(52) U.S. Cl.
CPC .............. *G11C 29/52* (2013.01); *G06F 21/31* (2013.01); *G11C 29/50004* (2013.01); *G06F 2221/2103* (2013.01); *G06F 2221/2113* (2013.01)

(58) Field of Classification Search
CPC ... G11C 29/52; G11C 29/50004; G06F 21/31; G06F 2221/2103; G06F 2221/2113
See application file for complete search history.

(56) References Cited

U.S. PATENT DOCUMENTS

| | | | | |
|---|---|---|---|---|
| 9,585,085 | B1* | 2/2017 | Guo | H04L 43/0876 |
| 2003/0204743 | A1* | 10/2003 | Devadas | G06Q 20/3674 |
| | | | | 726/9 |
| 2006/0156299 | A1* | 7/2006 | Bondi | G06F 11/1438 |
| | | | | 717/168 |
| 2007/0005967 | A1* | 1/2007 | Mister | H04L 9/3228 |
| | | | | 713/168 |
| 2007/0230260 | A1* | 10/2007 | Gorman | G11C 29/16 |
| | | | | 365/201 |
| 2008/0144144 | A1* | 6/2008 | Smithson | H04L 9/3271 |
| | | | | 358/520 |
| 2009/0231934 | A1* | 9/2009 | Jung | G11C 7/08 |
| | | | | 365/189.15 |
| 2009/0273473 | A1* | 11/2009 | Tuttle | G06K 7/0008 |
| | | | | 340/572.1 |
| 2009/0300027 | A1* | 12/2009 | Matsunaga | G06F 16/24565 |
| 2010/0241853 | A1* | 9/2010 | Taylor | H04M 1/72409 |
| | | | | 713/168 |
| 2010/0293612 | A1* | 11/2010 | Potkonjak | G06F 21/34 |
| | | | | 726/20 |
| 2010/0318798 | A1* | 12/2010 | Binding | G06F 21/554 |
| | | | | 713/170 |

(Continued)

*Primary Examiner* — Aravind K Moorthy
(74) *Attorney, Agent, or Firm* — Foley & Lardner LLP

(57) ABSTRACT

Disclosed herein are related to a system and a method of authenticating a device. In one aspect, a first challenge is identified from first challenges, where each of the first challenges has a consistent response with a stability above a first threshold across a variation of the device. In one aspect, a first response to the first challenge is received from the device. In one aspect, whether the first response matches the consistent response of the first challenge is determined. In one aspect, a second challenge from second challenges is identified, where each of the second challenges has an inconsistent response with a stability under a second threshold across the variation. In one aspect, a second response to the second challenge is received from the device. In one aspect, the device is authenticated responsive to determining that the first response matches the consistent response of the first challenge.

20 Claims, 5 Drawing Sheets

(56) References Cited

U.S. PATENT DOCUMENTS

| | | | |
|---|---|---|---|
| 2011/0131401 A1* | 6/2011 | Singh | G06F 21/31 713/2 |
| 2011/0317829 A1* | 12/2011 | Ficke | G06F 21/73 380/46 |
| 2012/0054834 A1* | 3/2012 | King | G06F 21/31 726/4 |
| 2012/0117639 A1* | 5/2012 | Bouz | H04L 63/0823 726/10 |
| 2013/0311768 A1* | 11/2013 | Fosmark | G06Q 20/3823 713/155 |
| 2014/0056091 A1* | 2/2014 | Kim | G11C 16/0483 365/218 |
| 2014/0156998 A1* | 6/2014 | Lambert | H04L 9/3273 713/182 |
| 2015/0028847 A1* | 1/2015 | Vanhoucke | G01R 19/0092 324/72 |
| 2015/0052060 A1* | 2/2015 | Klasen | G06F 21/35 705/57 |
| 2015/0318998 A1* | 11/2015 | Erlikhman | H04L 9/0863 713/171 |
| 2016/0088057 A1* | 3/2016 | Takeshita | G06F 3/1296 709/219 |
| 2016/0103981 A1* | 4/2016 | Boss | G06F 21/31 726/7 |
| 2016/0125288 A1* | 5/2016 | Pileggi | G06N 3/0635 706/29 |
| 2016/0180078 A1* | 6/2016 | Chhabra | H04L 63/083 726/19 |
| 2016/0214391 A1* | 7/2016 | Ward | G06F 21/44 |
| 2016/0247002 A1* | 8/2016 | Grieco | G06F 21/86 |
| 2016/0269186 A1* | 9/2016 | Wallrabenstein | G06F 21/31 |
| 2016/0285277 A1* | 9/2016 | Joehren | H02J 5/005 |
| 2017/0090822 A1* | 3/2017 | Yadav | G06F 3/0653 |
| 2017/0180373 A1* | 6/2017 | Shao | H04L 9/3228 |
| 2017/0192446 A1* | 7/2017 | Su | G06F 1/266 |
| 2017/0201524 A1* | 7/2017 | Dureau | G06F 21/35 |
| 2017/0310488 A1* | 10/2017 | Wajs | H04N 21/4627 |
| 2017/0364709 A1* | 12/2017 | Plusquellic | G06F 21/73 |
| 2018/0129801 A1* | 5/2018 | Cambou | H04L 9/0643 |
| 2018/0153457 A1* | 6/2018 | Montoya | G08B 13/19641 |
| 2018/0165344 A1* | 6/2018 | Williams | G06F 16/275 |
| 2019/0028283 A1* | 1/2019 | Sharifi | G06F 21/86 |
| 2019/0114115 A1* | 4/2019 | Wille | H04L 9/3278 |
| 2019/0132137 A1* | 5/2019 | Zhong | H04L 9/0866 |
| 2019/0238346 A1* | 8/2019 | Perlman | H04L 29/06782 |
| 2019/0272368 A1* | 9/2019 | Gavito | G06F 21/73 |
| 2019/0306705 A1* | 10/2019 | Suzuki | H04L 9/0825 |
| 2019/0332763 A1* | 10/2019 | Berler | H04L 9/3239 |
| 2019/0354672 A1* | 11/2019 | Bou | G06K 9/6215 |
| 2019/0369685 A1* | 12/2019 | Chang | G11C 7/222 |
| 2020/0012800 A1* | 1/2020 | Karako | G06K 19/0723 |
| 2020/0074068 A1* | 3/2020 | Fix | G06F 21/44 |
| 2020/0097643 A1* | 3/2020 | Uzun | G06K 9/00899 |
| 2020/0145235 A1* | 5/2020 | Choi | H04L 9/3278 |
| 2020/0162271 A1* | 5/2020 | Cambou | G09C 1/00 |
| 2020/0210584 A1* | 7/2020 | Ficarra | H04L 9/3271 |
| 2020/0242220 A1* | 7/2020 | Diato | G06F 21/31 |
| 2020/0257788 A1* | 8/2020 | Bhattacharyya | G06F 21/36 |
| 2021/0050065 A1* | 2/2021 | Moon | G11C 29/20 |
| 2021/0136678 A1* | 5/2021 | Han | H04L 43/16 |

* cited by examiner

DEVICE AUTHENTICATION BASED ON INCONSISTENT RESPONSES

FIELD OF DISCLOSURE

The present disclosure is generally related to authenticating a device based on a physical unclonable function (PUF), including but not limited to authenticating a device based on challenges associated with inconsistent responses.

BACKGROUND

A PUF is a physically-defined digital fingerprint that serves as a unique identity for a device such as a semiconductor device or an integrated circuit. In one aspect, a PUF is based on unique characteristics of a semiconductor device for a given challenge. For example, random data generated by a static random access memory (SRAM) or frequencies of an oscillator in the semiconductor device, in spite of a variation in at least one of process, voltage, or temperature (herein referred to as "PVT variation"), may be consistent and unique for that semiconductor device. In one approach, such unique characteristics of a semiconductor device can be used for authentication. For example, an authentication device or a server may store, during an enrollment phase, characteristics of the semiconductor device for given challenges. After the semiconductor device is enrolled, the authentication device can receive, from a device or a PUF of the device, a test response to a challenge for the enrolled semiconductor device, and authenticate the device to be the semiconductor device, in case the test response matches the stored response for the enrolled semiconductor device. However, challenge-response PUFs may be susceptible to attacks based on machine-learning. For example, a machine learning model can be trained based on previous challenges and responses for the semiconductor device, and responses for subsequent challenges or other challenges can be predicted according to the machine learning model.

SUMMARY

Various embodiments disclosed herein are related to an authentication device. In some embodiments, the authentication device includes a processor configured to receive, from a device, a first response to a first challenge and a second response to a second challenge. In some embodiments, the processor is configured to determine that the first response has a stability above a first threshold and the second response has a stability under a second threshold, across a variation in at least one of a process, voltage, or temperature of the device. In some embodiments, the processor is configured to store the first challenge with the first response and the second challenge while bypassing storing of the second response, responsive to determining that the first response has the stability above the first threshold and the second response has the stability under the second threshold, across the variation in at least one of the process, voltage, or temperature of the device.

In some embodiments, the processor is configured to receive, from the device, a third response to a third challenge. In some embodiments, the processor is configured to determine that the third response has a stability between the first threshold and the second threshold, across the variation in at least one of the process, voltage, or temperature of the device. In some embodiments, the processor is configured to bypass storing the third response and the third challenge according to determining that the third response has the stability between the first threshold and the second threshold, across the variation in at least one of the process, voltage, or temperature of the device. In some embodiments, the processor is configured to receive, from the device, a third response to the first challenge and a fourth response to the second challenge, to attempt to access a functionality or resource. In some embodiments, the processor is configured to authenticate the device responsive to determining that the third response matches the first response and irrespective of the fourth response. In some embodiments, the device includes an integrated circuit. In some embodiments, the first response comprises data indicative of a quantifiable characteristic or value inherent in a device. In some embodiments, the first response comprises a frequency of an oscillator, a propagation delay of a circuit element, or a value of a memory element. In some embodiments, the processor is configured to determine a ratio of i) first challenges rendering first responses to ii) second challenges rendering second responses, each of the first responses having a stability above the first threshold, each of the second responses having a stability below the second threshold. In some embodiments, the processor is configured to adjust the first threshold, the second threshold, or a combination of the first threshold and the second threshold according to the determined ratio Various embodiments disclosed herein are related to an authentication device. In some embodiments, the authentication device includes a processor configured to identify a first challenge from a plurality of first challenges, each of the plurality of first challenges having a consistent response with a stability above a first threshold across a variation in at least one of a process, voltage, or temperature of a device. In some embodiments, the processor is configured to receive, from the device, a first response to the first challenge. In some embodiments, the processor is configured to determine whether the first response matches the consistent response of the first challenge. In some embodiments, the processor is configured to identify a second challenge from a plurality of second challenges, each of the plurality of second challenges having an inconsistent response with a stability under a second threshold across the variation. In some embodiments, the processor is configured to receive, from the device, a second response to the second challenge. In some embodiments, the processor is configured to authenticate the device responsive to determining that the first response matches the consistent response of the first challenge, while ignoring the second response to the second challenge.

In some embodiments, the processor is configured to transmit, to the device, the first challenge and the second challenge, according to a request for the device to access a functionality or a resource. In some embodiments, the processor is configured to transmit, to the device, a set of challenges, according to a request for the device to access a functionality or resource, the set of challenges including one or more first challenges from the plurality of first challenges and one or more second challenges from the plurality of second challenges. In some embodiments, the one or more first challenges and the one or more second challenges are interleaved. In some embodiments, the processor is further configured to receive, from the device, a set of responses responsive to the set of challenges to access the functionality of the device, and count a number of responses from the set of responses matching the consistent responses of the one or more first challenges. In some embodiments, the processor is further configured to determine to authenticate the device responsive to determining that the counted number exceeds a predetermined threshold. In some embodiments, the device includes an integrated circuit.

Various embodiments disclosed herein are related to a method for authenticating a device. In some embodiments, the method includes identifying a first challenge from a plurality of first challenges, each of the plurality of first challenges having a consistent response with a stability above a first threshold across a variation in at least one of a process, voltage, or temperature of a device. In some embodiments, the method includes receiving, from the device, a first response to the first challenge. In some embodiments, the method includes determining whether the first response matches the consistent response of the first challenge. In some embodiments, the method includes identifying a second challenge from a plurality of second challenges, each of the plurality of second challenges having an inconsistent response with a stability under a second threshold across the variation. In some embodiments, the method includes receiving, from the device, a second response to the second challenge. In some embodiments, the method includes authenticating the device according to determining that the first response matches the consistent response of the first challenge, while ignoring the second response to the second challenge.

In some embodiments, the method includes transmitting, to the device, the first challenge and the second challenge, according to a request for the device to access a functionality of the device. In some embodiments, the method includes transmitting, to the device, a set of challenges, according to a request for the device to access a functionality of the device, the set of challenges including one or more first challenges from the plurality of first challenges and one or more second challenges from the plurality of second challenges. In some embodiments, the method includes interleaving the one or more first challenges and the one or more second challenges. In some embodiments, the method includes receiving, from the device, a set of responses responsive to the set of challenges to access the functionality of the device, and counting a number of responses from the set of responses matching the consistent responses of the one or more first challenges. In some embodiments, the method includes determining to authenticate the device responsive to determining that the counted number exceeds a predetermined threshold.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
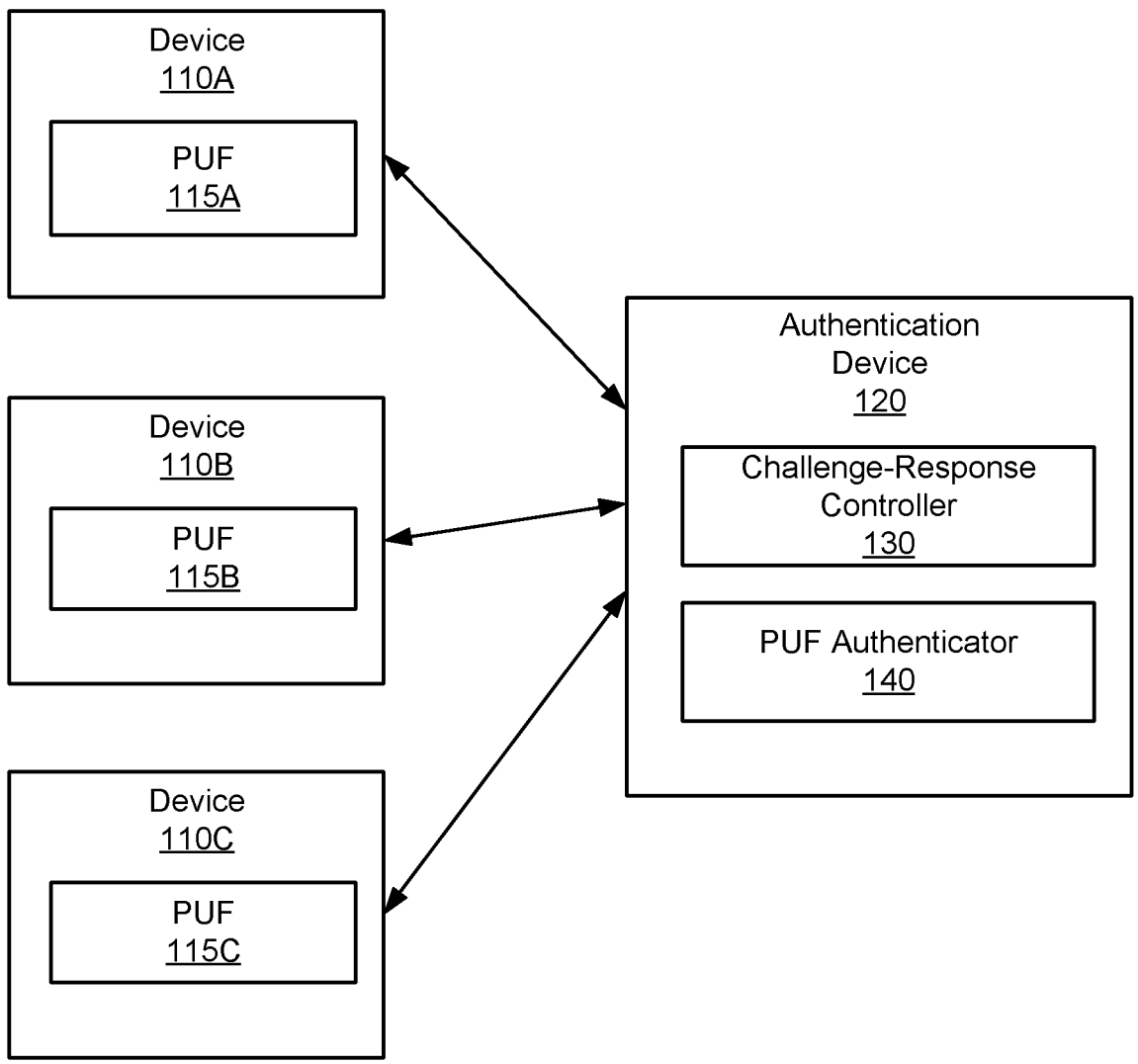
FIG. 1 is a diagram of a system environment including multiple devices and an authentication device for authenticating the devices, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are related to systems and methods for authenticating a device based on challenges rendering or triggering inconsistent responses or inconsistent characteristics of the device. In one aspect, the use or introduction of challenges that render or trigger inconsistent responses or inconsistent characteristics of the device can help improve the security of the device, e.g., by undermining the use of machine learning in creating an imposter for the device.

In one aspect, a semiconductor device or an integrated circuit under a PVT variation may exhibit a unique characteristic that are consistent or stable for a challenge provided as an input. For example, the semiconductor device may repeatedly or consistently generate, at a particular address of a memory, a same pattern of data after a wake up from a power off state, in spite of a PVT variation. During an enrollment phase, an authentication device or a server may determine or detect, for a challenge applied to the semiconductor device, a consistent characteristic of the semiconductor device under PVT variation, as a consistent response to the challenge, and can store both the challenge and the consistent response to the challenge. After enrollment, the authentication device may receive, from a requesting device, a response to a challenge for the semiconductor device, and in case the response matches the stored response for the semiconductor device, the authentication device may grant the requesting device access to one or more functionalities (e.g., associated with the semiconductor device) or resources. However, authentication based only on challenges associated with consistent responses may be vulnerable against an attack based on a machine learning model. For example, a machine learning model can be trained based on previous challenges and responses for the semiconductor device, and responses to subsequent challenges can be predicted according to the machine learning model.

In some embodiments, the authentication device or the server utilizes challenges that render inconsistent characteristics of the semiconductor device or inconsistent responses, to enhance security of the device. In one approach, the authentication device determines inconsistent characteristics of the semiconductor device under a PVT variation to be inconsistent responses, and stores challenges rendering the inconsistent responses. In one approach, the authentication device provides, to a requesting device, a combination or mixture of first challenges associated with inconsistent responses of the semiconductor device, and second challenges associated with consistent responses of the semiconductor device. In return, the authentication device may receive first responses to the first challenges and second responses to second challenges. The authentication device may perform authentication according to the second responses to the second challenges associated with the consistent responses, while ignoring the first responses. In one aspect, because the requesting device is unaware of which challenges are associated with consistent responses and which challenges are associated inconsistent responses, generating or training a machine learning model to predict correct responses or consistent responses becomes difficult. Accordingly, vulnerability of the semiconductor device against an attack based on a machine learning model can be reduced.

Referring to FIG. 1, illustrated is a diagram of a system environment 100 including multiple devices 110A, 110B, 110C and an authentication device 120 that authenticates the devices 110A, 110B, 110C, according to an example implementation of the present disclosure. The devices 110A, 110B, 110C and the authentication device 120 may communicate with each other through a network connection (e.g., wired connection, wireless connection or both) for enrolling and/or authenticating the devices 110A, 110B, 110C. In one aspect, the authentication device 120 enrolls different devices 110A, 110B, 110C during an enrollment phase, and authenticates the devices 110A, 110B, 110C during an authentication phase. In other embodiments, the system environment 100 includes more, fewer, or different components than shown in FIG. 1. In one example, the system environment 100 includes a different number of devices 110 than shown in FIG. 1. In one example, the system environment 100 includes a different number of authentication devices 120 or servers than shown in FIG. 1.

In some embodiments, devices 110A, 110B, 110C are semiconductor devices, integrated circuits, or some type of hardware or physical device. In some embodiments, each device 110X has a PUF 115X that is based on unique characteristics of the device 110X for given challenges. In one aspect, characteristics of different devices 110A, 110B, 110C are different or unique, such that different devices 110A, 110B, 110C can be identified by corresponding characteristics. For example, a SRAM of the device 110A can repeatedly or consistently generate a first pattern of data at a particular address after a wake up from a power off state, where s SRAM of the device 110B can repeatedly or consistently generate a second pattern of data at a particular address after a wake up from a power off state. The PUF 115X may receive (e.g., as a challenge) an address of an associated SRAM as a challenge from the authentication device 120, and can transmit data stored by the SRAM at the address as a response to the authentication device 120.

In some embodiments, the authentication device 120 is a component that authenticates the devices 110A, 110B, 110C. In one implementation, the authentication device 120 is implemented as a server. In some embodiments, the authentication device 120 includes a challenge-response controller 130 and a PUF authenticator 140. These components may operate together to enroll the devices 110A, 110B, 110C, and/or to authenticate the devices 110A, 110B, 110C. In some embodiments, the components of the authentication device 120 are implemented as hardware, or a combination of hardware and software. In some embodiments, the authentication device 120 is implemented as a processor and a non-transitory computer readable medium storing instructions when executed by the processor cause the processor to perform various processes disclosed herein. In other embodiments, the authentication device 120 includes more, fewer, or different components than shown in FIG. 1.

In some embodiments, during an enrollment phase, the challenge-response controller 130 enrolls different devices 110A, 110B, 110C. In one approach, the challenge-response controller 130 receives, from a device 110X, responses to challenges, and may determine which responses are stable or consistent and which responses are unstable or inconsistent. In one aspect, a consistent response corresponds to (e.g., is provided by, generated by, or reflective of) a characteristic of the device that is consistent or repeated across a PVT variation, where an inconsistent response corresponds to a characteristic that is inconsistent or not repeated across the PVT variation. For example, the challenge-response controller 130 provides memory address to the device 110A, and in return receives data generated by device 110A at the memory address after a wake up from a power off state under a first voltage condition. The challenge-response controller 130 may consistently, reliably or predictably repeat the process or result under different voltage conditions. If the data retrieved are consistent for varying voltage conditions, the challenge-response controller 130 may determine that the data generated at the memory address after the wake up from the power off state is a consistent response to the memory address as a challenge for the device 110A. If the data retrieved are inconsistent for varying voltage conditions or for varying attempts at the same voltage owing to temporal noise, the challenge-response controller 130 may determine that the data generated at the memory address after the wake up from the power off state is an inconsistent response to the memory address as a challenge for the device 110A. During the enrollment phase, the authentication device 120 may store, for each of the devices 110A, 110B, 110C, corresponding consistent responses. In addition, during the enrollment phase, the authentication device 120 may store, for each of the devices 110A, 110B, 110C, corresponding challenges rendering the consistent responses as true challenges and corresponding challenges rendering inconsistent responses as fake challenges. Detailed description on the process of enrolling a device 110 is provided below with respect to FIGS. 2 and 4.

In some embodiments, during an authentication phase after the enrollment phase, the PUF authenticator 140 authenticates the devices 110A, 110B, 110C. In one example, the PUF authenticator 140 receives, from a requesting device (e.g., the device 110A or another system communicatively connected to the device 110A), a request to access one or more functionalities or resources (e.g., associated with the device 110A). For example, the PUF authenticator 140 may receive, along with an identification of the device 110A, a request to operate the device 110A (or another device) or access content stored by the device 110A (or another device). In return, the PUF authenticator 140 may transmit, to the requesting device 110A, a group of challenges including at least a true challenge associated with a consistent response and at least a fake challenge associated with an inconsistent response. The PUF authenticator 140 may receive, from the requesting device, responses to the challenges provided. The PUF authenticator 140 may verify a first response to the true challenge associated with the consistent response, while ignoring a second response to the fake challenge associated with the inconsistent response. For example, the PUF authenticator 140 may authenticate the device in case (or when) the response to the true challenge matches the consistent response stored, and may not authenticate the device in case the test response to the true challenge does not match the consistent response stored. In one aspect, by providing both true challenges and fake challenges, generating a model to predict consistent responses becomes difficult. Hence, vulnerability of the devices 110A, 110B, 110C against attacks based on a machine learning model can be reduced. Detailed description on the process of authenticating a requesting device is provided below with respect to FIGS. 3 and 5.

Figure 2:
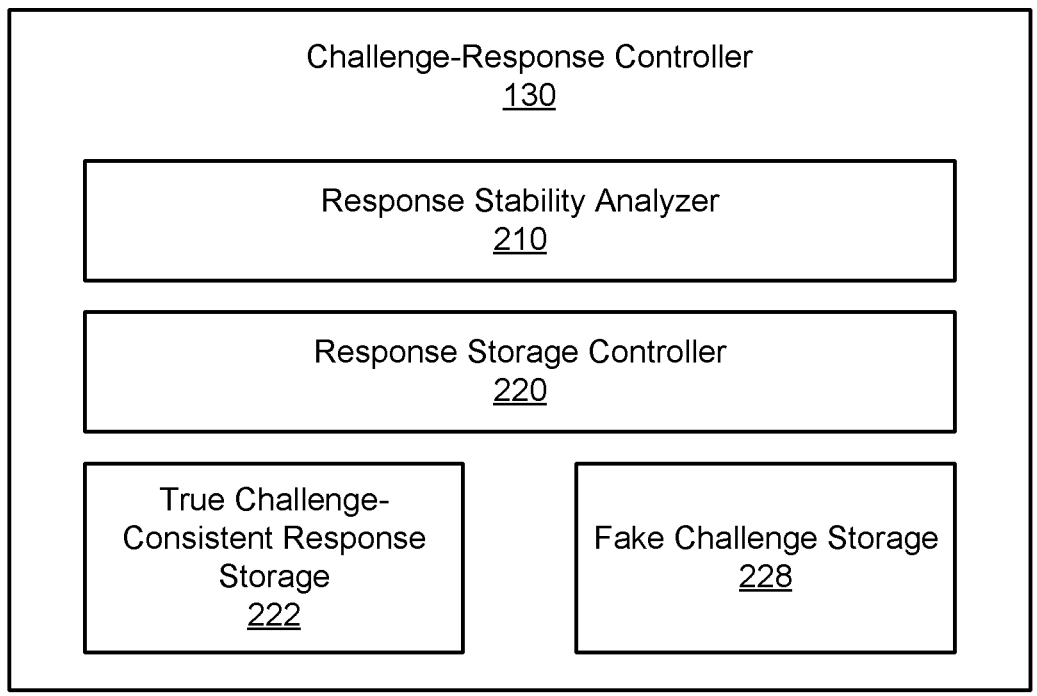
FIG. 2 is a diagram of a challenge-response controller, according to an example implementation of the present disclosure.

FIG. 2 is a diagram of the challenge-response controller 130 of FIG. 1, according to an example implementation of the present disclosure. In some embodiments, the challenge-response controller 130 includes a response stability analyzer 210, a response storage controller 220, a true challenge-consistent response storage 222, and/or a fake challenge storage 228. These components may operate together to enroll a device 110. In one approach, these components may operate together to determine consistent responses and inconsistent responses to challenges. Moreover, these components may operate together to store true challenges and associated consistent responses, and store fake challenges (e.g., with or without associated inconsistent responses). In other embodiments, the challenge-response controller 130 includes more, fewer, or different components than shown in FIG. 2.

In some embodiments, the response stability analyzer 210 includes or corresponds to a component that determines stabilities of responses to different challenges during an enrollment phase. In one approach, the response stability analyzer 210 provides a challenge to a device 110, and receives a response to the challenge from the device 110. In some embodiments, the response stability analyzer 210 applies a non-linear filter to the received response. A challenge may include a signal or trigger to configure the device 110, and a response may include or correspond to a characteristic of the device responsive to the signal or trigger. An example challenge includes an address of memory (e.g., SRAM) of the device 110, and an example response includes data generated by the memory of the device 110 at the address, after a wake up from a power off state. In one aspect, the response stability analyzer 210 receives different responses to a challenge for the device 110 operating under a PVT variation. The response stability analyzer 210 may count a number of the same responses or similar responses within a predetermined error range (e.g., 10%). In case a number or a ratio of the same or similar responses exceeds a first threshold (e.g., 90%), the response stability analyzer 210 may determine that the responses are consistent responses to the challenge. In case a number or a ratio of the same or similar responses is below a second threshold (e.g., 40%), the response stability analyzer 210 may determine that the responses are inconsistent responses to the challenge.

In some embodiments, the response storage controller 220 includes or corresponds to a component that stores true challenges and associated consistent responses, is or using a true challenge-consistent response storage 222, and stores fake challenges by a fake challenge storage 228 during the enrollment phase. In one aspect, the response storage controller 220 determines, for a device 110, a challenge rendering the consistent response as a true challenge, and stores a pair of the true challenge and the consistent response, in or using the true challenge-consistent response storage 222. In one aspect, the response storage controller 220 determines, for the device 110, a challenge rendering or triggering the inconsistent response as a fake challenge, and stores the fake challenge in or using the fake challenge storage 228. The response storage controller 220 may ignore, discard, or bypass storing inconsistent responses to the fake challenges. The response storage controller 220 may ignore, discard, or bypass storing responses with stability between the first threshold and the second threshold and a challenge rendering these responses (with the stability between the first threshold and the second threshold), because the challenge may not be as effective as the fake challenge in terms of neutralizing or undermining the machine learning model.

The authenticating device can modulate or adjust the number of stable (or true) and unstable (or fake) challenges that is applied, to meet a target false-pass or false-fail rate, a target challenge collection (count) and/or an authentication duration. In some embodiments, the response storage controller 220 adaptively adjusts the first threshold, the second threshold, or both. The response storage controller 220 may adjust the first threshold, the second threshold, or both, periodically or according to specific events or triggers. In one approach, the response storage controller 220 determines a ratio (e.g., target ratio) of true challenges to fake challenges. The response storage controller 220 may compare the determined ratio with a re-existing or predetermined ratio, and adaptively adjusts the first threshold, the second threshold or both according to the comparison. For example, the response storage controller 220 increases the first threshold and increases the second threshold, if the determined ratio is larger than a threshold to decrease a ratio of true challenges to fake challenges. For example, the response storage controller 220 decreases the first threshold and decreases the second threshold, if the determined ratio is less than a threshold to increase a ratio of true challenges to fake challenges. In one aspect, storing and applying more of the unstable or fake challenges can help improve immunity to machine learning attacks, but may increase authentication time during in-field operation. In one aspect, the response storage controller 220 increases the first threshold and decreases the second threshold to increase a gap between the first threshold and the second threshold to reduce a total number of challenges collected in a given time period. Having a wider gap between stable and unstable thresholds can reduce false acceptance rate (FAR) or false rejection rate (FRR), but can reduce the total number of challenges applied or collected in a given test time.

Figure 3:
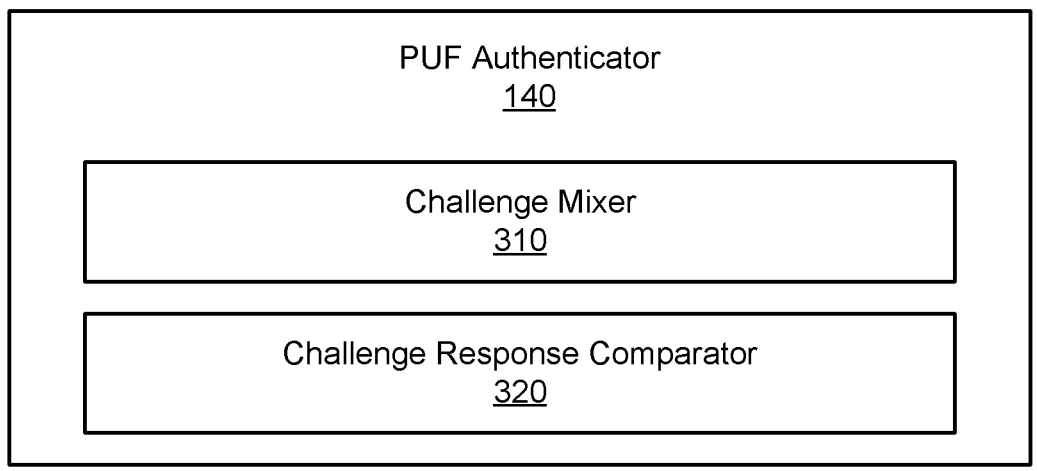
FIG. 3 is a diagram of a PUF authenticator, according to an example implementation of the present disclosure.

FIG. 3 is a diagram of the PUF authenticator 140 of FIG. 1, according to an example implementation of the present disclosure. In some embodiments, the PUF authenticator 140 includes a challenge mixer 310 and a challenge response comparator 320. These components may operate together to authenticate, utilizing a fake challenge, a requesting device. In one approach, these components may operate together to determine consistent responses and inconsistent responses to challenges. Moreover, these components may operate together to store true challenges and associated consistent responses, and store fake challenges. In other embodiments, the challenge-response controller 130 includes more, fewer, or different components than shown in FIG. 2.

In some embodiments, the challenge mixer 310 is a component that receives, from a requesting device, a request for authentication or a request to access one or more functionalities of a device 110, and provides a set of challenges including at least a true challenge and a fake challenge to a requesting device during an authentication phase. In one aspect, the challenge mixer 310 retrieves true challenges for the device 110 from the true challenge-response storage 222, and retrieves fake challenges for the device 110 from the fake challenge storage 228, in a manner opaque, hidden or unknown to the device 110. The challenge mixer 310 may interleave or intermingle fake challenges for the device 110 with true challenges for the device 110, for example, in a predetermined sequence, in an adaptively-determined sequence, or in a random sequence. The challenge mixer 310 may interleave fake challenges for the device 110 with true challenges for the device 110, for example, in a predetermined ratio, in an adaptively-determined ratio, or in a random ratio. Increasing the ratio of fake challenges to true challenges, and/or increasing the number of fake and/or true challenges for instance, can make it more difficult to train a machine learning model. In some embodiments, the challenge mixer 310 may modulate, adapt or update the mix of fake challenges and true challenges, depending upon various scenarios or factors such as geographic region of use, risk or security level, trade-off between processing time and resiliency to attacks, and so on. In some embodiments, the challenge mixer 310 may incorporate or mix challenges of different types (e.g., associated with different PUF types or circuit topologies). In some embodiments, the challenge mixer 310 may limit the use of a particular challenge to a particular count (e.g., only once) or frequency (e.g., 10 times in one year). The challenge mixer 310 may provide the set of challenges to the requesting device. In one aspect, the requesting device is unaware of which challenges are true challenges and which challenges are fake challenges.

In some embodiments, the challenge response comparator 320 includes or corresponds to a component that receives, from the requesting device, responses to the set of challenges provided, and authenticates the requesting device according to the responses. In one approach, the challenge response comparator 320 determines which of the responses are responsive to true challenges and which of the responses are responsive to fake challenges, for example, according to a sequence of responses received and prior knowledge of a sequence of the true and fake challenges issued by the challenge mixer 310. The challenge response comparator 320 may compare responses to true challenges with corresponding consistent responses, and authenticate the requesting device according to the comparison. For example, the challenge response comparator 320 grants the requesting device access to one or more functionalities or resources (e.g., associated with the device 110), when the test responses to the true challenges match the corresponding consistent responses. For example, the challenge response comparator 320 may deny the requesting device access to one or more functionalities or resources, when the test responses to the true challenges do not match the corresponding consistent responses. The challenge response comparator 320 may ignore or disregard test responses to fake challenges.

Figure 4:
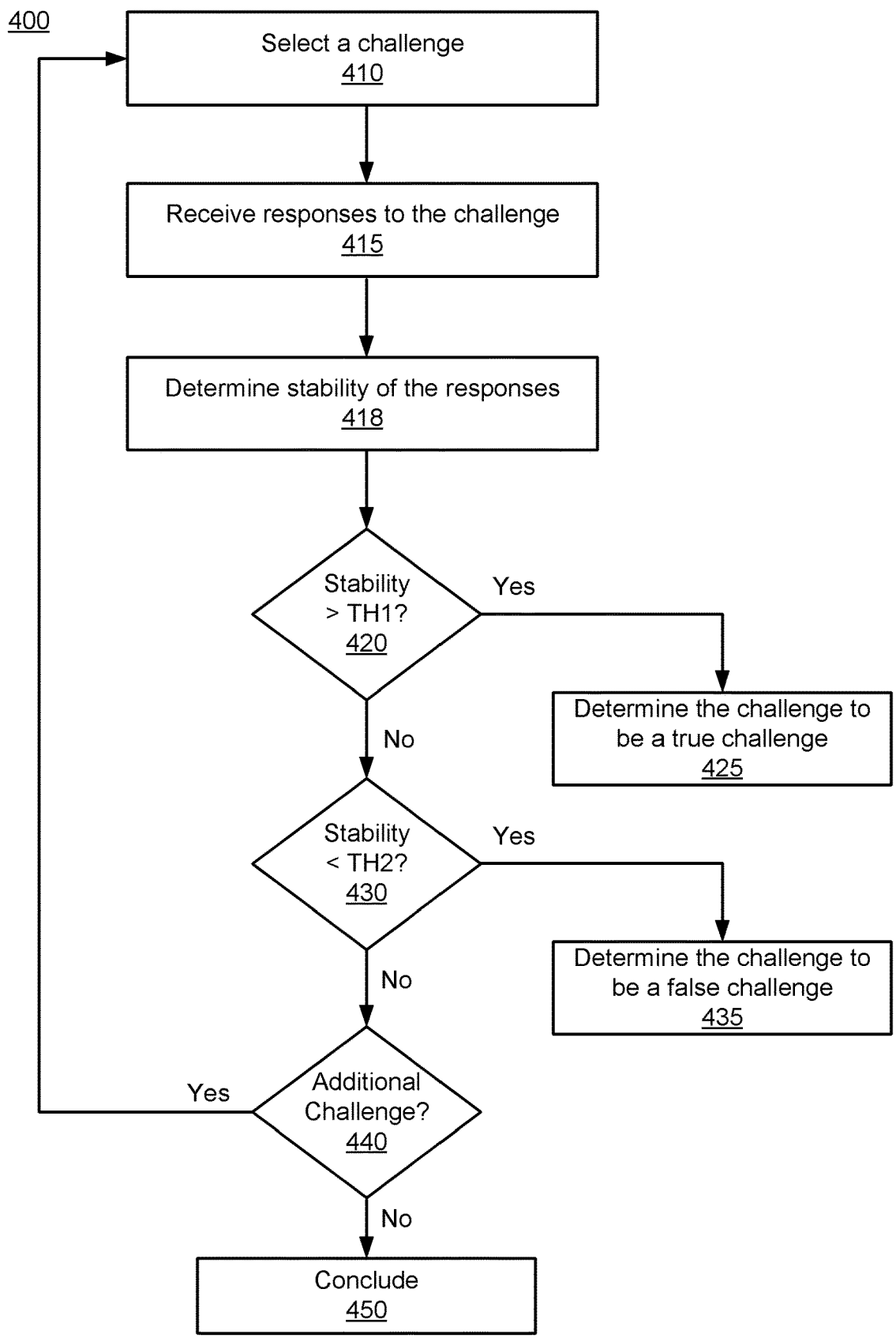
FIG. 4 is a flow chart illustrating a process of enrolling a device, according to an example implementation of the present disclosure.

FIG. 4 is a flow chart illustrating a process 400 of enrolling a device 110 during an enrollment phase, according to an example implementation of the present disclosure. In some embodiments, the process 400 is performed by the authentication device 120 or the server of FIG. 1. In some embodiments, the process 400 is performed by other entities. In some embodiments, the process 400 includes more, fewer, or different steps than shown in FIG. 4.

In one approach, the authentication device 120 selects 410 a challenge for a device 110, and transmits the challenge to the device 110. In return, the authentication device 120 receives 415 responses to the challenge across a PVT variation. A challenge may be a signal or trigger to configure the device 110 to display or yield a characteristic, and a response may be characteristic of the device responsive to the signal or trigger. For example, the signal can include or indicate an address of a memory (e.g., SRAM) of the device 110. In response to the address, the SRAM may generate "random" data after a wake up from a power off state. For another example, the signal indicates or describes how to configure a ring oscillator. For example, some delay circuits (e.g., inverters) of the ring oscillator can be selectively enabled or utilized, and the other delay circuits of the ring oscillator can be selectively disabled or excluded according to the signal corresponding to the challenge. In response to the configuration of the ring oscillator, the ring oscillator may generate or produce an oscillation signal at a particular frequency, which can be measured or detected to be different from an oscillation frequency of another ring oscillator (in the same device or another device) in the same configuration. A response to the challenge may be reflective of the measurement or detection results (e.g., which frequency is higher or lower, difference in frequency, and so on). In one aspect, a characteristic of the device in response to a challenge may be unique to the device 110 (e.g., a consistent characteristic), and can include a signal propagation delay or time, a signal amplitude, a signal shape, a resistance/capacitance/inductance value or characteristic, a frequency, a persistence value or measure, a physical/mechanical/electrical/magnetic characteristic, etc. In some embodiments, a consistent characteristic may be a combination (e.g., using a non-linear function) of two or more characteristics of the device in response to a challenge. In one aspect, a consistent characteristic of the device in response to the challenge in spite of a PVT variation, can be utilized as a consistent response to the challenge to distinguish the device 110 from other devices.

In one approach, the authentication device 120 determines 418 a stability of (or across) responses to the challenge. For example, the authentication device 120 counts a number of same or similar responses to the challenge (within an error range e.g., ±10%), or determines a ratio of the same or similar responses with respect to a total number of responses to the challenge. In one approach, the authentication device 120 compares 420 the stability of responses to the challenge with a first threshold (e.g., 90%). If the stability exceeds the first threshold, the authentication device 120 determines 425 that the challenge is a true challenge and the responses to the challenge are consistent responses. The authentication device 120 may store a true challenge, and a consistent response to the true challenge. In one approach, the authentication device 120 compares 430 the stability of responses to the challenge with a second threshold (e.g., 40%). If the stability is below the second threshold, the authentication device 120 determines 435 that the challenge is a fake challenge and the responses to the challenge are inconsistent responses. The authentication device 120 may bypass storing the inconsistent responses. The authentication device 120 may store a fake challenge. The authentication device 120 may ignore, discard, or bypass storing a challenge and a response between the first threshold and the second threshold.

In one approach, the authentication device 120 determines 440 whether an additional challenge for the device 110 exists or not. If an additional challenge for the device 110 exists, the authentication device 120 may return to the step 410, and select 410 the additional challenge to repeat the steps for the additional challenge. If no more challenge exists for the device 110, the authentication device 120 may conclude 450 the process 400. Alternatively, the device 110 may return to the step 410 for another device to determine consistent responses or inconsistent responses to one or challenges for the another device.

Figure 5:
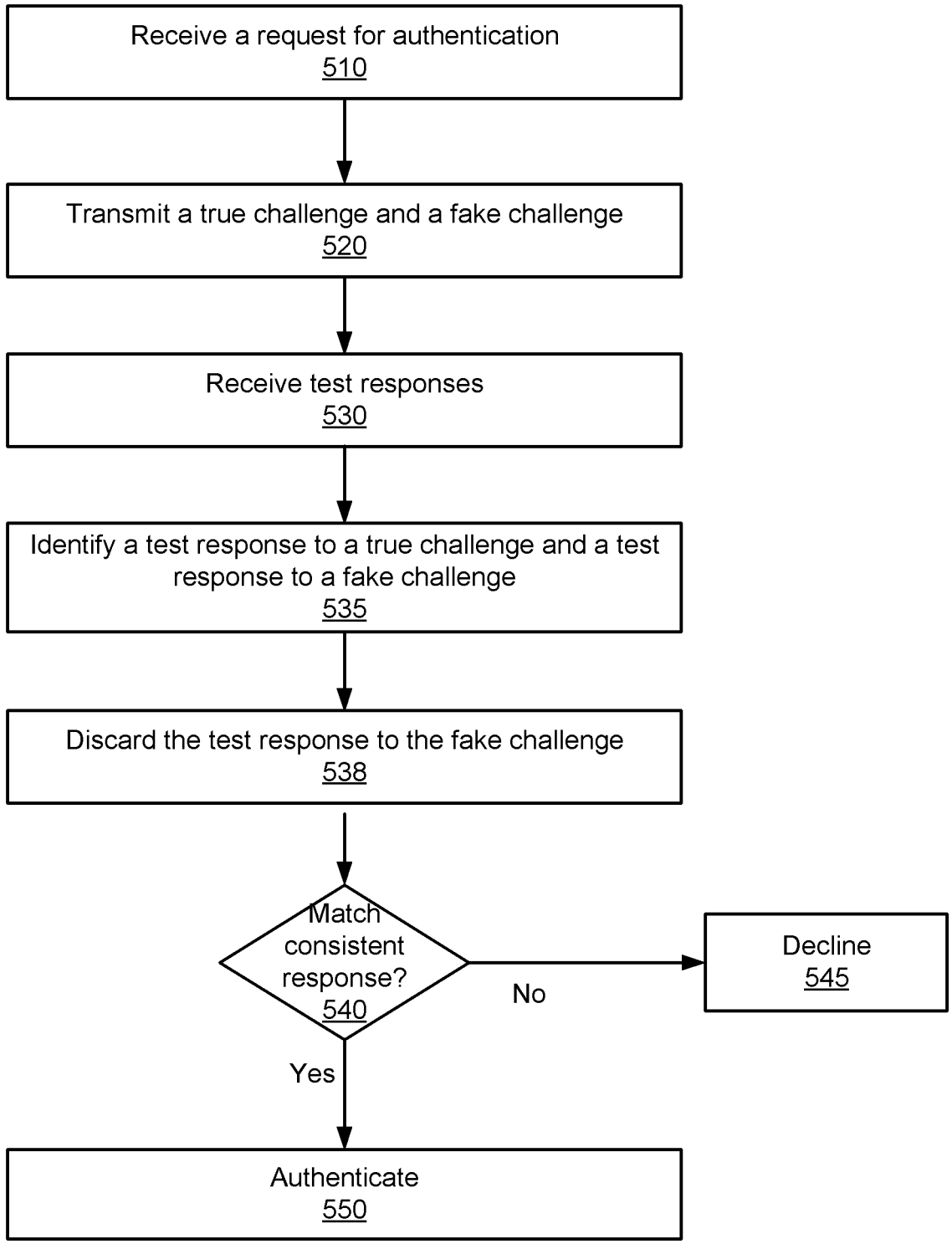
FIG. 5 is a flow chart illustrating a process of authenticating a device, according to an example implementation of the present disclosure.

FIG. 5 is a flow chart illustrating a process 500 of authenticating a device 110 during an authentication phase, according to an example implementation of the present disclosure. In some embodiments, the process 500 is performed by the authentication device 120 or the server of FIG. 1. In some embodiments, the process 500 is performed by other entities. In some embodiments, the process 500 includes more, fewer, or different steps than shown in FIG. 5.

In one approach, the authentication device 120 receives 510 a request for authentication from a requesting device. In one example, the requesting device may request to access one or more functionalities or resources (e.g., associated with a device 110 or another device). The request may include an identification of the device 110.

In one approach, the authentication device 120 transmits 520 a set of challenges including at least a true challenge and a fake challenge. The authentication device 120 may retrieve, from a plurality of challenges for different devices, challenges associated with the device 110, for example, based on the identification of the device 110. The authentication device 120 may select one or more true challenges for the device 110 and one or more fake challenges for the device 110, and can mix the selected challenges. The authentication device 120 may interleave the selected fake challenges with the selected true challenges. In one aspect, the requesting device is unaware of which challenge is a true challenge and which challenge is a fake challenge.

In one approach, the authentication device 120 receives 530, from the requesting device, responses to the challenges provided. The authentication device 120 identifies 535 which responses are responsive to true challenges associated with consistent responses and which responses are responsive to fake challenges associated with inconsistent responses, for example, according to a sequence of the responses received. The authentication device 120 may ignore or discard 538 the responses to the fake challenges.

In one approach, the authentication device 120 determines 540 whether the responses to true challenges associated with consistent responses match the consistent responses, irrespective of (or without regards to) the responses to the fake challenges. If the test responses to the true challenges match the consistent responses, the authentication device 120 may authenticate 550 the requesting device to be really the device (that it purports to be), and grant the requesting device access to one or more functionalities or resources. For example, the authentication device 120 may allow the requesting device to operate the device 110 (or another device) or access content associated with the device 110 (or another device). If the responses to the true challenges do not match the consistent responses, the authentication device 120 may decline 545 authentication of the requesting device, and do not grant the requesting device access to one or more functionalities or resources.

Figure 6:
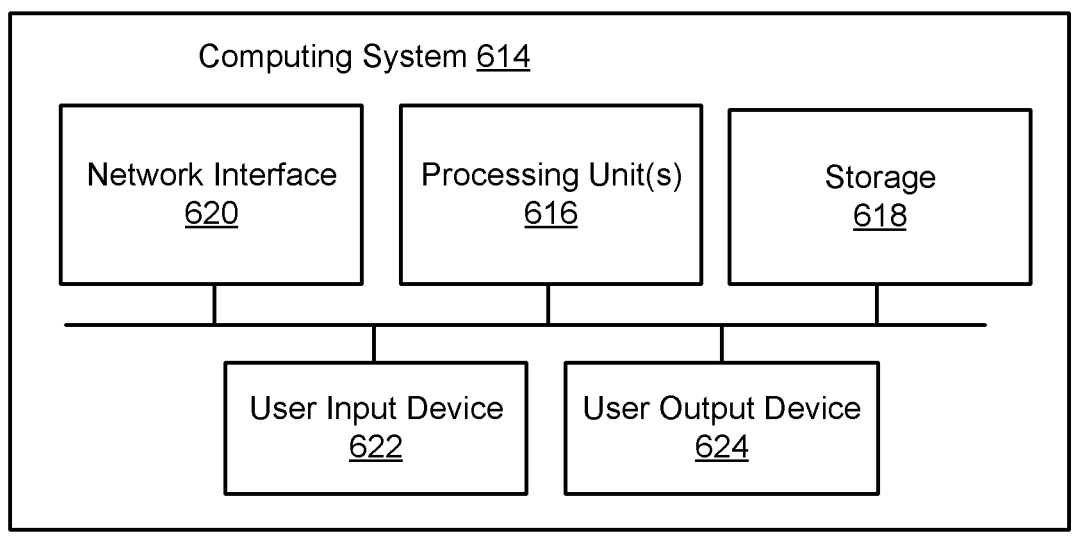
FIG. 6 is a block diagram of a computing environment according to an example implementation of the present disclosure.

Various operations described herein can be implemented on computer systems. FIG. 6 shows a block diagram of a representative computing system 614 usable to implement the present disclosure. In some embodiments, the device 110, the authentication device 120 (or server) or both of FIG. 1 are implemented by the computing system 614. Computing system 614 can be implemented, for example, as a consumer device such as a smartphone, other mobile phone, tablet computer, wearable computing device (e.g., smart watch, eyeglasses, head mounted display), desktop computer, laptop computer, or implemented with distributed computing devices. The computing system 614 can be implemented to provide VR, AR, MR experience. In some embodiments, the computing system 614 can include conventional computer components such as processors 616, storage device 618, network interface 620, user input device 622, and user output device 624.

Network interface 620 can provide a connection to a wide area network (e.g., the Internet) to which WAN interface of a remote server system is also connected. Network interface 620 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 622 can include any device (or devices) via which a user can provide signals to computing system 614; computing system 614 can interpret the signals as indicative of particular user requests or information. User input device 622 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 624 can include any device via which computing system 614 can provide information to a user. For example, user output device 624 can include a display to display images generated by or delivered to computing system 614. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 624 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 616 can provide various functionality for computing system 614, including any of the functionality described herein as being performed by a server or client, or other functionality associated with message management services.

It will be appreciated that computing system 614 is illustrative and that variations and modifications are possible. Computer systems used in connection with the present disclosure can have other capabilities not specifically described here. Further, while computing system 614 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B' can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. An authentication device comprising:
    a processor configured to:
        receive, from a device, a first response to a first challenge and a second response to a second challenge,
        determine that the first response has a stability above a first threshold and the second response has a stability under a second threshold, across a variation in at least one of a process, voltage, or temperature of the device, and
        store the first challenge with the first response, and the second challenge while bypassing storing of the second response, responsive to determining that the first response has the stability above the first threshold and the second response has the stability under the second threshold, across the variation in at least one of the process, voltage, or temperature of the device.

2. The authentication device of claim 1, wherein the processor is further configured to:
    receive, from the device, a third response to a third challenge,
    determine that the third response has a stability between the first threshold and the second threshold, across the variation in at least one of the process, voltage, or temperature of the device, and
    bypass storing the third response and the third challenge, responsive to determining that the third response has the stability between the first threshold and the second threshold, across the variation in at least one of the process, voltage, or temperature of the device.

3. The authentication device of claim 1, wherein the processor is further configured to:
    receive, from the device, a third response to the first challenge and a fourth response to the second challenge, to attempt to access a functionality associated with the device, and
    authenticate the device responsive to determining that the third response matches the first response, irrespective of the fourth response.

4. The authentication device of claim 1, wherein the processor is configured to:
    determine a ratio of i) first challenges rendering first responses to ii) second challenges rendering second responses, each of the first responses having a stability above the first threshold, each of the second responses having a stability below the second threshold, and
    adjust the first threshold, the second threshold, or a combination of the first threshold and the second threshold according to the determined ratio.

5. The authentication device of claim 1, wherein the first response comprises data indicative of a quantifiable characteristic or value inherent in the device.

6. The authentication device of claim 1, wherein the first response comprises a frequency of an oscillator, a propagation delay of a circuit element, or a value of a memory element.

7. An authentication device comprising:
    a processor configured to:
        identify a first challenge from a plurality of first challenges, each of the plurality of first challenges having a consistent response with a stability above a first threshold across a variation in at least one of a process, voltage, or temperature of a device,
        receive, from the device, a first response to the first challenge,
        determine whether the first response matches the consistent response of the first challenge,
        identify a second challenge from a plurality of second challenges, each of the plurality of second challenges having an inconsistent response with a stability under a second threshold across the variation,
        receive, from the device, a second response to the second challenge, and
        authenticate the device responsive to determining that the first response matches the consistent response of the first challenge, while ignoring the second response to the second challenge.

8. The authentication device of claim 7, wherein the processor is further configured to:
    transmit, to the device, the first challenge and the second challenge, in response to a request for the device to access a functionality or resource.

9. The authentication device of claim 7, wherein the processor is further configured to:
    transmit, to the device, a set of challenges, according to a request for the device to access a functionality or resource, the set of challenges including one or more first challenges from the plurality of first challenges, and one or more second challenges from the plurality of second challenges.

10. The authentication device of claim 9, wherein the one or more first challenges and the one or more second challenges are interleaved within the transmitted set of challenges.

11. The authentication device of claim 9, wherein the processor is further configured to:
   receive, from the device, a set of responses responsive to the set of challenges, and
   determine a number of responses from the set of responses matching consistent responses of the one or more first challenges.

12. The authentication device of claim 11, wherein the processor is further configured to:
   authenticate the device responsive to determining that the number of responses exceeds a predetermined threshold.

13. The authentication device of claim 7, wherein the device comprises an integrated circuit.

14. A method comprising:
   identifying a first challenge from a plurality of first challenges, each of the plurality of first challenges having a consistent response with a stability above a first threshold across a variation in at least one of a process, voltage, or temperature of a device;
   receiving, from the device, a first response to the first challenge;
   determining whether the first response matches the consistent response of the first challenge;
   identifying a second challenge from a plurality of second challenges, each of the plurality of second challenges having an inconsistent response with a stability under a second threshold across the variation;
   receiving, from the device, a second response to the second challenge; and
   authenticating the device responsive to determining that the first response matches the consistent response of the first challenge, while ignoring the second response to the second challenge.

15. The method of claim 14, further comprising:
   transmitting, to the device, the first challenge and the second challenge, according to a request for the device to access a functionality or resource.

16. The method of claim 14, further comprising:
   transmitting, to the device, a set of challenges, according to a request for the device to access a functionality or resource, the set of challenges including one or more first challenges from the plurality of first challenges and one or more second challenges from the plurality of second challenges.

17. The method of claim 16, further comprising:
   interleaving the one or more first challenges and the one or more second challenges.

18. The method of claim 16, further comprising:
   receiving, from the device, a set of responses responsive to the set of challenges; and
   determining a number of responses from the set of responses matching the consistent responses of the one or more first challenges.

19. The method of claim 18, further comprising:
   authenticating the device responsive to determining that the number of responses exceeds a predetermined threshold.

20. The method of claim 14, wherein the device comprises an integrated circuit.

* * * * *